(12) United States Patent
Abe et al.

(10) Patent No.: US 8,830,298 B2
(45) Date of Patent: Sep. 9, 2014

(54) WIDE-ANGLE LENS AND IMAGING APPARATUS USING THE SAME

(75) Inventors: Issei Abe, Yokohama (JP); Hayato Yoshida, Morioka (JP); Naoki Moniwa, Hanamaki (JP)

(73) Assignee: Ricoh Company, Ltd., Tokyo (JP)

( * ) Notice: Subject to any disclaimer, the term of this patent is extended or adjusted under 35 U.S.C. 154(b) by 657 days.

(21) Appl. No.: 13/121,022

(22) PCT Filed: Sep. 24, 2009

(86) PCT No.: PCT/JP2009/067117
§ 371 (c)(1),
(2), (4) Date: Mar. 25, 2011

(87) PCT Pub. No.: WO2010/035880
PCT Pub. Date: Apr. 1, 2010

(65) Prior Publication Data
US 2011/0169912 A1 Jul. 14, 2011

(30) Foreign Application Priority Data

Sep. 26, 2008 (JP) ................. 2008-247324

(51) Int. Cl.
*G02B 13/04* (2006.01)
*G02B 13/18* (2006.01)
*H04N 5/225* (2006.01)
*G02B 13/00* (2006.01)
*G02B 9/60* (2006.01)

(52) U.S. Cl.
CPC ............... *G02B 13/04* (2013.01); *G02B 13/18* (2013.01); *G02B 13/0045* (2013.01); *G02B 9/60* (2013.01)
USPC ............. 348/36; 359/649; 359/663; 359/740; 359/717; 359/753

(58) Field of Classification Search
USPC ............ 348/36; 359/649, 663, 740, 753, 754, 359/717
See application file for complete search history.

(56) References Cited

U.S. PATENT DOCUMENTS 7,283,312 B2    10/2007   Kawada
7,773,305 B2    8/2010   Yoshida et al.
(Continued)

FOREIGN PATENT DOCUMENTS

JP    2002 072085    3/2002
JP    2004 317866    11/2004
(Continued)

OTHER PUBLICATIONS

Extended European Search Report issued Nov. 29, 2012, in Patent Application No. 09816292.8.

(Continued)

*Primary Examiner* — Anner Holder
*Assistant Examiner* — On S Mung
(74) *Attorney, Agent, or Firm* — Oblon, Spivak, McClelland, Maier & Neustadt, L.L.P.

(57) ABSTRACT

A wide-angle lens comprising: an imaging lens system, including: a front lens group, an aperture, and a rear lens group, arranged in that order from an object side to an image side; wherein said front lens group comprises first and second lens elements, having negative power respectively, and a third lens that is a positive lens, arranged in that order from the object side to an aperture side; wherein said rear lens group comprises fourth and fifth lens elements, having positive power respectively, arranged in order from the aperture side to the image side; where an incident angle to an optical axis of the imaging lens system of a chief ray of a maximum angle of view passing through the aperture is $\theta I$, the following Expression 1 is satisfied.

40° (degrees)<$\theta I$<60° (degrees)      Expression 1.

13 Claims, 10 Drawing Sheets

(56) References Cited

U.S. PATENT DOCUMENTS

| | | | |
|---|---|---|---|
| 2005/0068637 A1* | 3/2005 | Suzuki | 359/689 |
| 2005/0259333 A1* | 11/2005 | Matsusaka | 359/680 |
| 2006/0055907 A1* | 3/2006 | Kato et al. | 355/67 |
| 2006/0087747 A1 | 4/2006 | Ohzawa et al. | |
| 2006/0139770 A1 | 6/2006 | Wang et al. | |
| 2006/0158741 A1* | 7/2006 | Miyauchi et al. | 359/663 |
| 2007/0053078 A1* | 3/2007 | Iiyama et al. | 359/754 |
| 2007/0139793 A1 | 6/2007 | Kawada | |
| 2008/0037138 A1 | 2/2008 | Lang et al. | |
| 2008/0130128 A1 | 6/2008 | Yamashita et al. | |
| 2010/0254025 A1 | 10/2010 | Yoshida et al. | |

FOREIGN PATENT DOCUMENTS

| | | |
|---|---|---|
| JP | 2005 062694 | 3/2005 |
| JP | 2006 119368 | 5/2006 |
| JP | 2007 025499 | 2/2007 |
| JP | 2007 164079 | 6/2007 |
| JP | 2008 035263 | 2/2008 |
| JP | 2008 058387 | 3/2008 |
| JP | 4090246 | 3/2008 |
| JP | 2008 102493 | 5/2008 |
| JP | 2008 276185 | 11/2008 |
| JP | 2009-216956 A | 9/2009 |

OTHER PUBLICATIONS

Office Action issued on Jan. 29, 2013, in Japanese patent Application No. 2008-247324.
Kishikawa, T., Ch. 2: "An imaging relationship in a paraxial region," Introduction to Optics, p. 15, (Jul. 13, 1997).
International Search Report issued Nov. 2, 2009 in PCT/JP09/67117 filed Sep. 24, 2009.

* cited by examiner

WIDE-ANGLE LENS AND IMAGING APPARATUS USING THE SAME

TECHNICAL FIELD

The present invention relates to a wide-angle lens and an imaging apparatus using the same. In particular, the present invention relates to an imaging apparatus that can be suitably applied to an in-vehicle camera device, etc., in which a wide-angle lens with a wide angle of view is demanded.

BACKGROUND ART

A wide-lens comprising an imaging lens system including a front lens group, and a rear lens group arranged from an object side toward an image side, and an aperture arranged therebetween, and the imaging lens system having 6 lens elements in the front and the rear lens groups in total is known (see Japanese Patent Publication No. 2002-72085).

Moreover, as a wide-angle lens which has improved the one disclosed in Japanese Patent Publication No. 2002-72085, a wide-lens comprising an imaging lens system including less than or equal to 5 lens elements in the front and the rear lens groups in total is also known. In this wide-angle lens, an angle of view is equal to or more than 190 degrees (see Japanese Patent Publication No. 2007-25499).

Because the wide-angle lens disclosed in Japanese Patent Publication No. 2002-72085 corrects various aberrations by use of many lens elements, the degree of freedom in designing is comparatively large; however, it is difficult to reduce the number of lens elements. Accordingly, the overall length of the imaging lens system becomes long, and it is difficult to achieve miniaturization of the lens, thus causing an increase in cost and weight.

On the other hand, because the wide-angle lens disclosed in Japanese Patent Publication No. 2007-25499 is a lens element disposed behind the aperture and constructed of only one lens element having positive power, an incident angle of a chief ray incident on an image plane at a position where an image height is high becomes large, that is, an angle of a chief ray of a maximum image height passing through the aperture is less than or equal to 40° (degrees). Therefore, when a camera module is constructed by arranging an image sensor at the position on the image plane, the incident angle of the chief ray incident on the image sensor at the position where the image height is high becomes larger, and the light amount incident on the image sensor decreases.

In an image sensor, or an image sensor with a microlens, the larger an incident angle of a chief ray of luminous flux incident on the imaging plane becomes, the less the luminous flux becomes that can be led to a pixel (light receiving part) on the imaging plane of the image sensor; therefore a light amount loss is generated.

Moreover, the larger an incident angle of the chief ray of luminous flux incident on the imaging plane becomes, the darker an imaging lens system with the larger an f-number becomes. Therefore, a photographic image at low illumination becomes dark for the imaging apparatus using this imaging lens system.

SUMMARY OF THE INVENTION

An object of the present invention is to provide a wide-angle lens, where the light amount loss in a peripheral part of the image sensor is small, and which is low in cost. This is because the wide-angle lens has an imaging lens system which has a wide-angle exceeding 180° (degrees), and the overall length is short, and the incident angle of the chief ray on the image plane is comparatively small.

To achieve an object of the present invention, an embodiment of the present invention provides a wide-angle lens, comprising: an imaging lens system, including: a front lens group arranged on an object side, a rear lens group arranged on an image side, and an aperture arranged therebetween, and the front lens group and the rear lens group are constructed of five lens elements in total, wherein the front lens group in which two lens elements, which are first and second lens elements, having negative power respectively, and one lens element, which is a third lens element having positive power, are arranged in order from the object side to an aperture side, and the rear lens group in which two lens elements, which are fourth and fifth lens elements, having positive power respectively, are arranged in order from the aperture side to the image side, where an incident angle to an optical axis of the imaging lens system of a chief ray of a maximum angle of view passing through the aperture is θI, the following Expression 1 is satisfied.

$$40° \text{ (degrees)} < \theta I < 60° \text{ (degrees)} \quad \text{Expression 1}$$

Preferably, the incident angle θI is defined in a meridional plane.

Preferably, the fourth lens element is constructed such that an angle between a chief ray radiated from the fourth lens element and the optical axis becomes smaller than an angle between a chief ray incident on the fourth lens element, and the fifth lens element is constructed of an aspheric lens such that an angle between a chief ray radiated from the fifth lens element and the optical axis becomes smaller than an angle between a chief ray radiated from the fourth lens element and incident on the fifth lens element and the optical axis.

Preferably, where an Abbe's number of the fourth lens element is ν4, the following Expression 2 is satisfied.

$$\nu 4 > 70 \quad \text{Expression 2}$$

Preferably, the wide-angle lens has an angle of view exceeding 180 degrees.

Preferably, a surface on the image side of the fifth lens element is an aspheric surface.

Preferably, a material of the first lens element is glass.

Preferably, a surface on the image side of the second lens element is an aspheric surface.

To achieve an object of the present invention, an embodiment of the present invention provides: an imaging apparatus, comprising: a wide-angle lens, including: an imaging lens system, having; a front lens group arranged on an object side, a rear lens group arranged on an image side, and an aperture arranged therebetween, and the front lens group and the rear lens group are constructed of five lens elements in total, wherein the front lens group in which two lens elements, which are first and second lens elements, having negative power respectively, and one lens element, which is a third lens element having positive power, are arranged in order from the object side to an aperture side, and the rear lens group in which two lens elements, which are fourth and fifth lens elements, having positive power respectively, are arranged in order from the aperture side to the image side, where an incident angle to an optical axis of the imaging lens system of a chief ray of a maximum angle of view passing through the aperture is θI, the following Expression 1 is satisfied; an image sensor which has a pixel arranged two-dimensionally and converts a photographic subject imaged on the pixel by the wide-angle lens to image data; a memory which stores image data outputted from the image sensor; a memory output controller which reads out image data according to a specified angle from the memory; a first signal processor which corrects a distortion of the wide-angle lens; a second signal processor which corrects a lateral chromatic aberration of the wide-angle lens; and a third signal processor which corrects a modulation transfer function (MTF) of the wide-angle lens.

$$40° \text{ (degrees)} < \theta I < 60° \text{ (degrees)} \qquad \text{Expression 1}$$

To achieve an object of the present invention, an embodiment of the present invention provides: an in-car camera device, comprising: an imaging apparatus, including: a wide-angle lens, having: an imaging lens system, having: a front lens group arranged on an object side, a rear lens group arranged on an image side, and an aperture arranged therebetween, and the front lens group and the rear lens group are constructed of five lens elements in total, wherein the front lens group in which two lens elements, which are first and second lens elements, having negative power respectively, and one lens element, which is a third lens element having positive power, are arranged in order from the object side to an aperture side, and the rear lens group in which two lens elements, which are fourth and fifth lens elements, having positive power respectively, are arranged in order from the aperture side to the image side, where an incident angle to an optical axis of the imaging lens system of a chief ray of a maximum angle of view passing through the aperture is θI, the following Expression 1 is satisfied; an image sensor which has a pixel arranged two-dimensionally and converts a photographic subject imaged on the pixel by the wide-angle lens to image data; a memory which stores image data outputted from the image sensor; a memory output controller which reads out image data according to a specified angle from the memory; a first signal processor which corrects a distortion of the wide-angle lens; a second signal processor which corrects a lateral chromatic aberration of the wide-angle lens; and a third signal processor which corrects a modulation transfer function (MTF) of the wide-angle lens.

$$40° \text{ (degrees)} < \theta I < 60° \text{ (degrees)} \qquad \text{Expression 1}$$

BRIEF DESCRIPTION OF THE DRAWINGS

The accompanying drawings are included to provide a further understanding of the invention, and are incorporated in and constitute a part of this description. The drawings illustrate embodiments of the invention and together with the description, serve to explain the principle of the invention.

DESCRIPTION OF EMBODIMENTS

Figure 1:
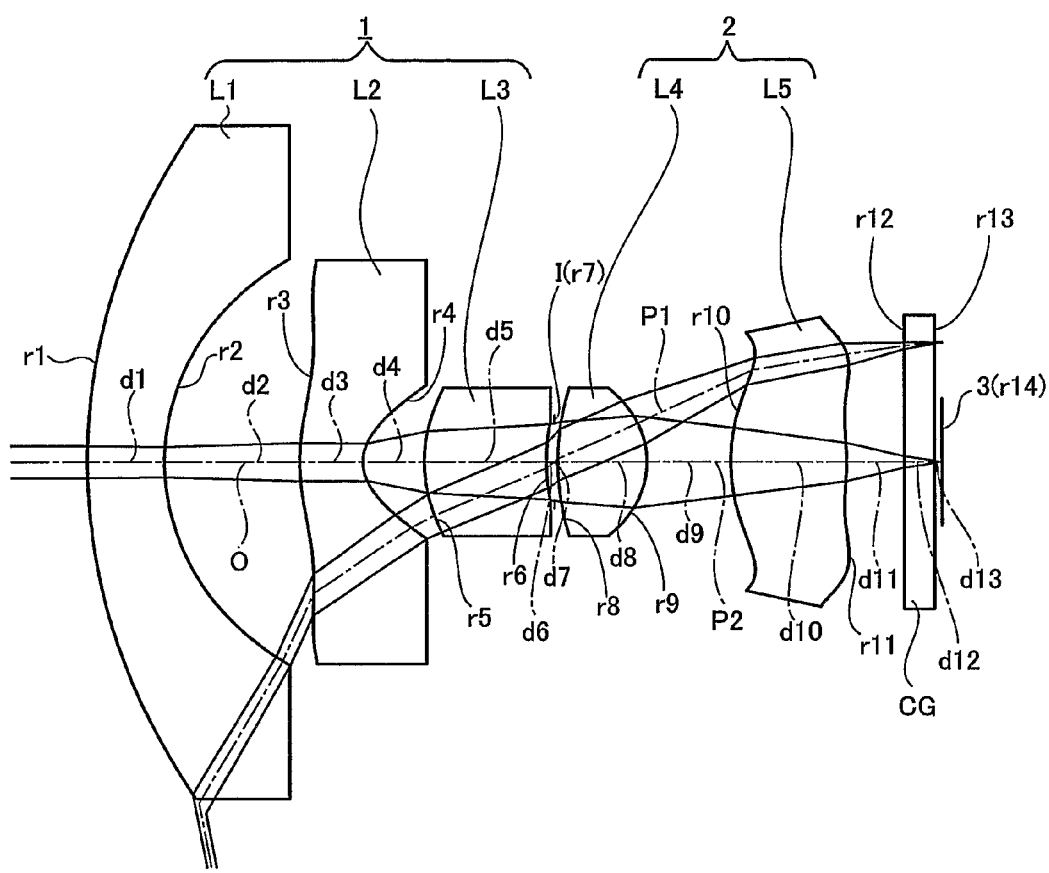
FIG. 1 is an optical diagram of a wide-angle lens according to Example 1 of the present invention.

Hereinafter, referring to the drawings, embodiments of a wide-angle lens and an imaging apparatus using the wide-angle lens according to the present invention will be explained.

Example 1

FIG. 1 illustrates an imaging lens system of Example 1 of an embodiment of an invention of the wide-angle lens according to the present invention. In this FIG. 1, reference symbol 1 denotes a front lens group, and reference symbol 2 denotes a rear lens group. The Front lens group 1 is arranged on an object side (left side of FIG. 1), the rear lens group 2 is arranged on an image side (right side of FIG. 1), and the aperture I is arranged therebetween.

The front lens group 1 includes a first lens element L1, a second lens element L2, and a third lens element L3. The rear lens group 2 includes a fourth lens element L4 and a fifth lens element L5. The number of lens elements included in the front lens group 1 and the number of lens elements included in the rear lens group 2 are five in total. The imaging lens system is constructed of these five lens elements in total. Each of the lens elements from the first lens element L1 to the fifth lens element L5 is a single lens, and is not a cemented lens. The aperture I is arranged between the third lens element L3 and the fourth lens element L4.

In FIG. 1, reference symbols r1 to r6 denote a first surface to a sixth surface of the wide-angle lens, respectively, and reference symbols r8 to r11 denote an eighth surface to an eleventh surface of the wide-angle lens, respectively, and reference symbol r7 denotes a seventh surface, that is, the aperture I. reference symbols d1 to d12 denote adjacent surface intervals, respectively. Reference symbol CG denotes a cover glass and reference symbol 3 denotes an image plane. An angle of view is set to be 200° (degrees).

The first lens element L1 and the second lens element L2 have negative power (negative focal length). The third lens element L3, the fourth lens element L4, and the fifth lens element L5 have positive power (positive focal length).

That is, the front lens group 1 has the first lens element L1, the second lens element L2, and the third lens element L3 that have negative, negative, and positive power in order from the object side. By a power characteristic of the lens, it is possible to refract the light that is incident in a wide-angle manner from the object side gradually on each surface of the first lens element L1, the second lens element L2, and the third lens element L3 constructing the front lens group 1. Especially, it is possible to inhibit a generation of an aberration as much as possible, and pass an off-axis light through the aperture I, and guide to the lens elements L4 and L5 constructing the rear group 2.

Especially, the surface r4 on the image side of the second lens element L2 which has the negative power and is arranged secondarily from the object side of the front lens group 1 is an aspheric surface such that a curvature gradually becomes small toward an optical axis O.

Therefore, a difference between power in a sagittal direction and power in a meridional direction that the off-axis light receives from the surface r4 can be reduced. Accordingly, a generation of an astigmatism can be inhibited, and resolution on the image plane 3 can be improved.

Figure 2:
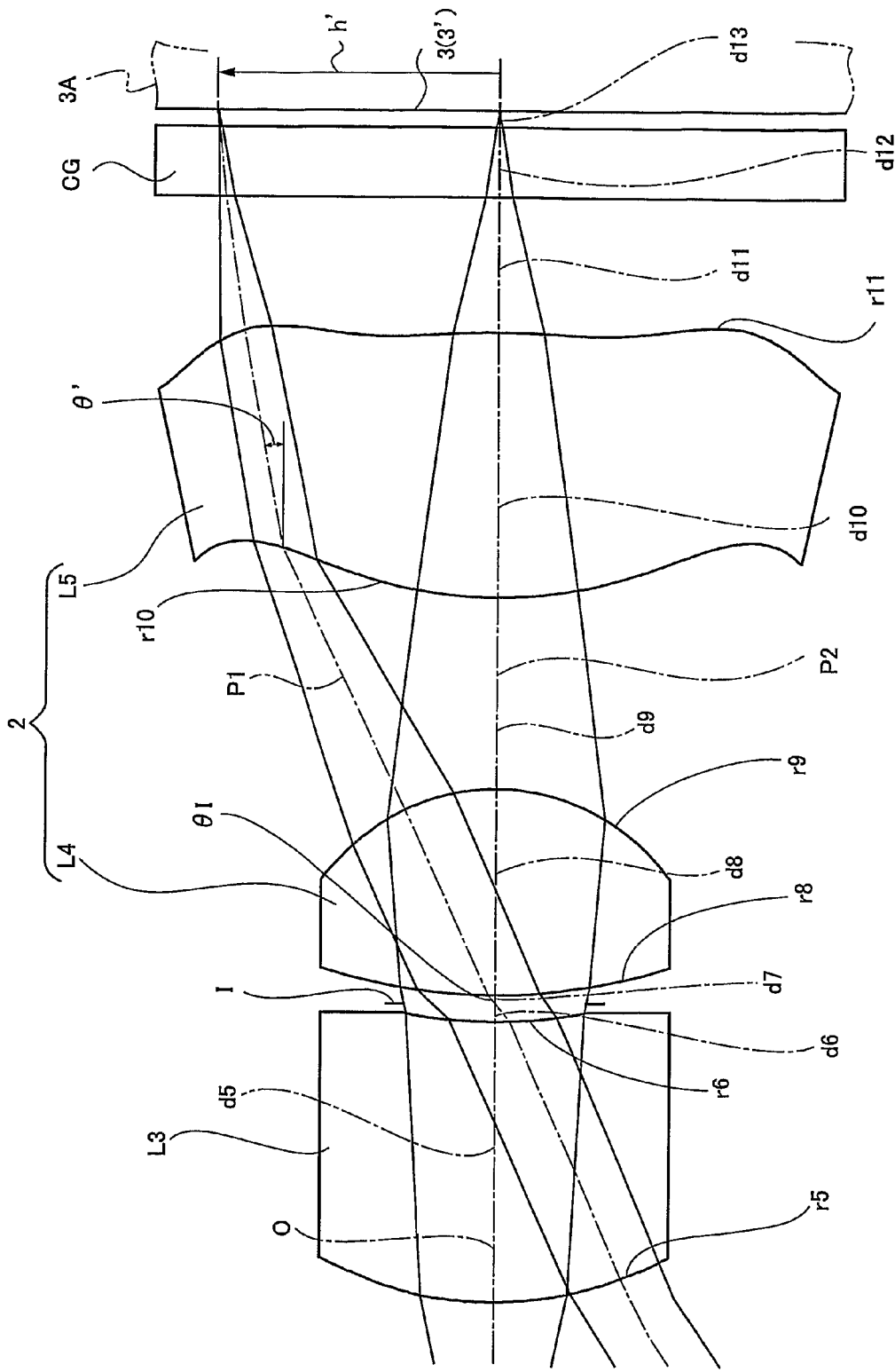
FIG. 2 is a partially-enlarged diagram of the wide-angle lens illustrated in FIG. 1.

Generally, the rear lens group 2 corrects optical aberrations such as an astigmatism, a coma aberration, and a chromatic aberration, and has a role of reducing an incident angle θ' to the optical axis O of a chief ray P1 of a maximum angle of view which is incident on the image plane 3 (an imaging plane 3' of an image sensor 3A), as enlarged and illustrated in FIG. 2. And the rear lens group 2 may reduce not only the incident angle θ' to the optical axis O of the chief ray of the maximum angle of view which is incident on the image plane 3 but also the incident angle θ' to the optical axis O of a chief ray of a comparatively large angle of view.

In this example, the rear lens group 2 includes two lens elements that have positive, and positive power in order from a near side to the aperture I. Therefore, an aberration correction is performed efficiently, and an imaging effect of light onto the imaging plane 3' of the image sensor 3 is improved, and an angle (the incident angle θ' to the optical axis O of the chief ray P1) between a normal line of the image plane 3 (the imaging plane 3' of the image sensor 3A) and the chief ray P1 incident on the image plane 3 (the imaging plane 3' of the image sensor 3A) is reduced as much as possible. A light amount loss of the luminous flux incident on the image sensor 3A is greatly reduced.

In particular, because the surface r11, which is a surface of the fifth lens element in the rear lens group 2 nearest to the image side and distant from the aperture I, is a surface where chief rays P1 and P2 to each image height in the rear lens group 2 are most separated, it is therefore preferable for it to be an aspheric surface.

Therefore, aberration corrections of the distortion and the astigmatism of the imaging lens system are easily performed, and incident angles of the chief rays P1 and P2 onto the image plane 3 (the imaging plane 3' of the image sensor 3A) are easily controlled. As a result, the resolution on the imaging plane 3' of the image sensor 3A is improved, and it is possible to set the distortion to a target value by an optical design easily and reduce the light amount loss of the luminous flux incident on the image sensor 3A.

In a case where lens elements having negative, negative and positive power in order from the object side are arranged for the front lens group 1 and lens elements having positive and positive power in order from an aperture I side are arranged for the rear lens group 2, by setting an incident angle θI of the chief ray P1 of a maximum image height passing through the aperture I to be more than 40° and less than 60°, as in the following Expression 1, an incident angle to the optical axis O of the chief ray P1 incident on the imaging plane 3' of the image sensor 3A can be within 15°.

$$40°<\theta I<60°$$ Expression 1

That is, an incident angle θ' to the optical axis O of the chief ray P1 incident at a high position of an image height on the imaging plane 3' of the image sensor 3A such as a CCD (charge-coupled device) and a CMOS (complementary metal-oxide semiconductor) becomes small, and a decrease in the light amount incident on the image sensor 3A can be inhibited.

As for the image sensor such as the CCD and the CMOS, and an image sensor with a microlens, the larger the incident angle to the optical axis of the chief ray P1 of the luminous flux incident on the imaging plane becomes, the less the luminous flux becomes that can be led to the pixel (light receiving part) of the imaging plane of the image sensor, and therefore the light amount loss is generated.

In the present example, while increasing the incident angle θI of the chief ray of the maximum image height passing through the aperture I and gradually decreasing the incident angle to the optical axis O on a meridional plane of the chief ray P1 from the aperture I side toward the image plane 3 by the two lens elements of the fourth lens element L4 and the fifth lens element L5 having positive power in the rear lens group 2, by converging a homocentric bundle of rays (bundle of rays which radiate from a point light source) of each chief ray (that is, converging each chief ray and peripheral ray of each chief ray), it is possible to maintain a size of an image on the image plane 3, and reliably maintain the resolution, and decrease the incident angle θ' to the optical axis O of each chief ray incident on the image plane 3. (see "*Kougaku Nyuumon* (Introduction to optics) (Author: Toshiro Kishikawa) *Chapter2: Kinjikuryouiki No Ketsuzoukankei* (an imaging relationship in a paraxial region) (pp. 15) fifth impression of the first edition published on Jul. 13, 1997 Publisher: Optronics Co., Ltd." about "homocentric bundle of rays")

Here, if a distance (d7+d8+d9+d10+d11+d12+d13) between the aperture I and the image plane 3 is lengthened, the incident angle θ' to the optical axis O of the chief ray incident on the image plane 3 is decreased without setting the incident angle θI to be equal to or more than 40°. However, if constructed as described above, the distance between the surface r1 of the first lens element L1 on the object side and the image plane 3, that is, the overall length of the imaging lens system, becomes longer, and it is impossible to miniaturize a wide-angle lens.

In Example 1, in the rear lens group 2 including the fourth lens element L4 and the fifth lens element L5, the fourth lens element L4 is constructed such that an angle between the chief ray radiated from the fourth lens element L4 and the optical axis O becomes smaller than an angle between the chief ray incident on the fourth lens element L4 arranged on a near side to the aperture I and the optical axis O. In addition, in the rear lens group 2 including the fourth lens element L4 and the fifth lens element L5, the fifth lens element L5 is constructed of an aspheric lens such that an angle between the chief ray radiated from the fifth lens element L5 and the optical axis O becomes smaller than an angle between the chief ray radiated from the fourth lens element L4 arranged on the near side to the aperture I and incident on the fifth lens element L5 arranged on a distant side from the aperture I and the optical axis O. Therefore, the optical system of the wide-angle lens is miniaturized, and in a state where the size of the image on the image plane 3 is maintained and the resolution is reliably maintained, it is possible to reduce the light amount loss in a peripheral part of the image sensor.

Moreover, when the thickness of the third lens element L3 having positive power arranged immediately anterior to the aperture I is thickened, the degree of freedom of a lateral chromatic aberration correction is improved. (see paragraph number 0033 in Japanese Patent Publication No. 2007-25499).

However, when the thickness of the third lens element L3 arranged immediately anterior to the aperture I is thickened, the amount of glass material used increases, and the cost rises, and at the same time the total weight of the wide-angle lens increases.

Thus, the third lens element L3 constructed of a lens system where two lenses are cemented is considered. However, even if the wide-angle lens is designed with the above construction, the cost of manufacturing and the assembly cost of a lens module rise, accordingly it is undesirable.

Therefore, in the wide-angle lens of this Example 1, a condition of an Abbe's number ν4 of the fourth lens element L4 is expressed by the following expression.

$$\nu 4 > 70 \qquad \text{Expression 2.}$$

Therefore, the chromatic aberration (a longitudinal chromatic aberration and a lateral chromatic aberration) can be effectively reduced. That is, the load of a chromatic aberration correction by the third lens element L3 can be reduced, and as a result, it is possible to reduce the chromatic aberration on the image plane 3 without increasing the thickness of the third lens element L3.

Moreover, in this example, the material of the second lens element L2, the third lens element L3, and the fifth lens element L5, which are aspheric lenses, is plastic, and the material of the first lens element L1 is glass. Because the melting point of plastic is lower than glass, fabrication is easy, and long-life molds for press molding of the second lens element L2, the third lens element L3, and the fifth lens element L5 are obtained, and thereby it is possible to reduce the cost. In addition, since the material of the first lens element L1 is glass, even if pebbles, etc. strike the surface of the first lens element L1 on the object side arranged in a state of being exposed outside the camera module, it is difficult for the lens to become scratched compared to a lens made of plastic material.

Hereinafter, a specific example of Example 1 will be explained.

Specific Example

Here, an f-number designed for the wide-angle lens of the specific example is 2.0, and a designed reference wavelength of the luminous flux is 587.56 nm.

An aspheric surface of this specific example is defined by the following known definitional equation. In the equation, h expresses coordinates in the direction perpendicular to the optical axis O, Z expresses coordinates in the direction of the optical axis, R expresses a curvature radius, K expresses a conic constant, and A, B and C express aspheric surface coefficients of a high order.

$$Z=(h^2/R)/[1+\{1-(1+K)(h^2/R^2)\}^{1/2}]+Ah^4+Bh^6+Ch^8$$

In the following Table 1, a surface number, a curvature radius r, a surface interval d, a refractive index n, and an Abbe's number ν are illustrated.

The surface number is given in order from the object side toward the image side. In Table 1, a subscript of the surface interval d means its surface number and O (circle) means an aspheric surface.

TABLE 1

| | SURFACE NUMBER | CURVATURE RADIUS r | SURFACE INTERVAL d | REFRACTIVE INDEX n | ABBE'S NUMBER ν | ASPHERIC SURFACE |
|---|---|---|---|---|---|---|
| L1 | 1 | 9.520 | $d_1$ 1.000 | 1.8350 | 42.9 | |
| | 2 | 3.581 | $d_2$ 1.780 | | | |
| L2 | 3 | 3.242 | $d_3$ 0.850 | 1.5327 | 56.7 | ○ |
| | 4 | 0.650 | $d_4$ 0.820 | | | ○ |
| L3 | 5 | 2.291 | $d_5$ 1.610 | 1.5840 | 30.8 | ○ |
| | 6 | 4.625 | $d_6$ 0.100 | | | ○ |
| | 7 (APERTURE I) | ∞ | $d_7$ 0.050 | | | |
| L4 | 8 | 3.981 | $d_8$ 1.180 | 1.4970 | 81.6 | |
| | 9 | −1.422 | $d_9$ 1.100 | | | |
| L5 | 10 | 3.159 | $d_{10}$ 1.520 | 1.5327 | 56.7 | ○ |
| | 11 | −4.561 | $d_{11}$ 0.775 | | | ○ |
| | 12 | ∞ | $d_{12}$ 0.400 | 1.5163 | 64.1 | |
| | 13 | ∞ | $d_{13}$ 0.100 | | | |
| | 14 (IMAGE PLANE) | | | | | |

○ = ASPHERIC SURFACE

In the following Table 2, specific numerical values of a conic constant K of the aspheric surface, and aspheric surface coefficients A, B and C regarding the surface numbers 3 to 6, 10, and 11 of this wide-angle lens are illustrated.

TABLE 2

| SURFACE NUMBER | K | A | B | C |
|---|---|---|---|---|
| 3 | −1.974281 | −0.041192 | 0.005065 | −0.000200 |
| 4 | −0.770286 | −0.216903 | −0.015592 | −0.016246 |
| 5 | 0.908860 | −0.019677 | −0.005351 | −0.001061 |
| 6 | 5.364467 | 0.125059 | −0.164217 | 0.240824 |
| 10 | −0.841657 | 0.019348 | −0.012266 | −0.000250 |
| 11 | −0.055434 | 0.163871 | −0.062138 | 0.006209 |

In the following Table 3, a specific value of a focal length, a specific value of the incident angle θI satisfying Expression 1, and a specific value of the Abbe's number ν4 satisfying Expression 2 of this wide-angle lens are illustrated.

TABLE 3

| FOCAL LENGTH | 0.95 |
|---|---|
| SPECIFIC VALUE OF INCIDENT ANGLE SATISFYING EXPRESSION 1 | 42.2° |
| SPECIFIC VALUE OF ABBE'S NUMBER SATISFYING EXPRESSION 2 | 81.6 |

By setting the incident angle θI to be 42.2° as described in Table 3, the incident angle to the optical axis O of the chief ray P1 incident on the image plane 3 of the wide-angle lens of this specific example becomes approximately 14.6°, and therefore it is possible to inhibit a decrease in the light amount incident on the image plane 3, that is, the imaging plane 3' of the image sensor 3A. The incident angle θI may be equal to or more than 42.2°, however an upper limit of the incident angle θI is naturally determined to be less than 90° by the construction of the imaging lens system, and it is desirable to be less than 60°.

When the incident angle θI becomes larger than 60°, a light beam is easily shaded by vignetting caused by a lens or a holding frame, because the possibility of a decrease in the light amount in a peripheral part of the angle of view on the image plane 3 is increased.

Thus, when the incident angle θI is equal to or more than 42.2° as described in Table 3, a maximum value of the incident angle to the optical axis O of the chief ray P1 incident on the image plane 3 of the wide-angle lens of this specific example becomes 14.6°, and therefore it is possible to inhibit a decrease in the light amount of the luminous flux incident on the image plane. Additionally, since the overall length of the imaging lens system (a distance from the surface r1 of the first lens element L1 on the object side to the image plane 3) is also shortened to 11.285 mm, it is possible to miniaturize the imaging lens system.

Figure 3:
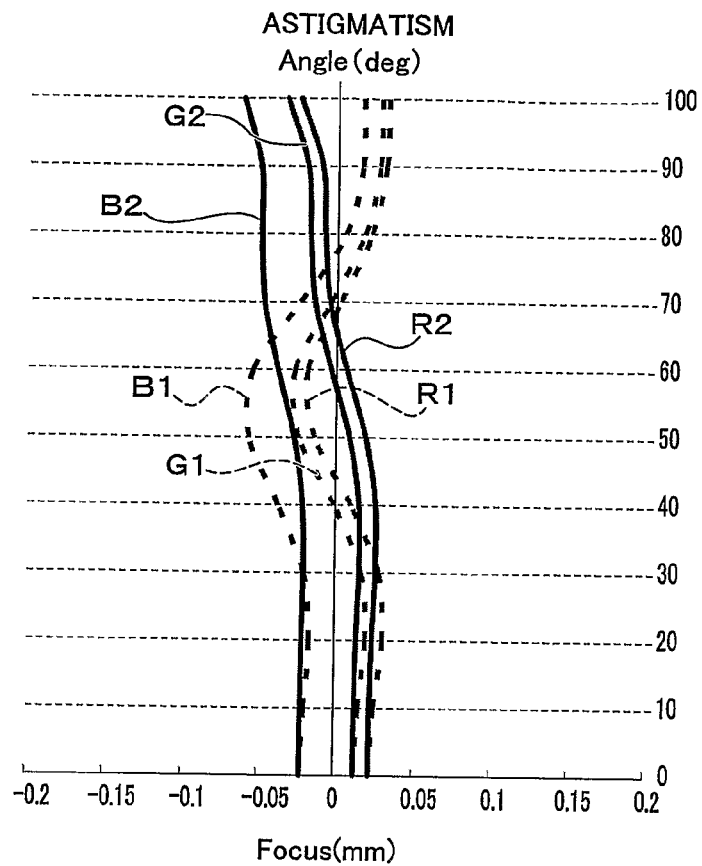
FIG. 3 is a diagram illustrating an astigmatism curve of the wide-angle lens illustrated in FIG. 1.
Figure 4:
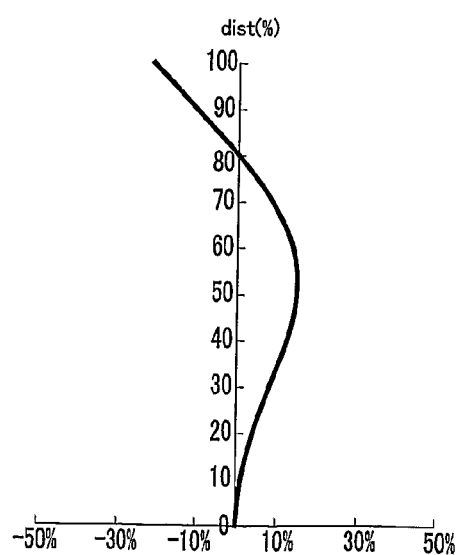
FIG. 4 is a diagram illustrating a distortion curve of the wide-angle lens illustrated in FIG. 1.
Figure 5:
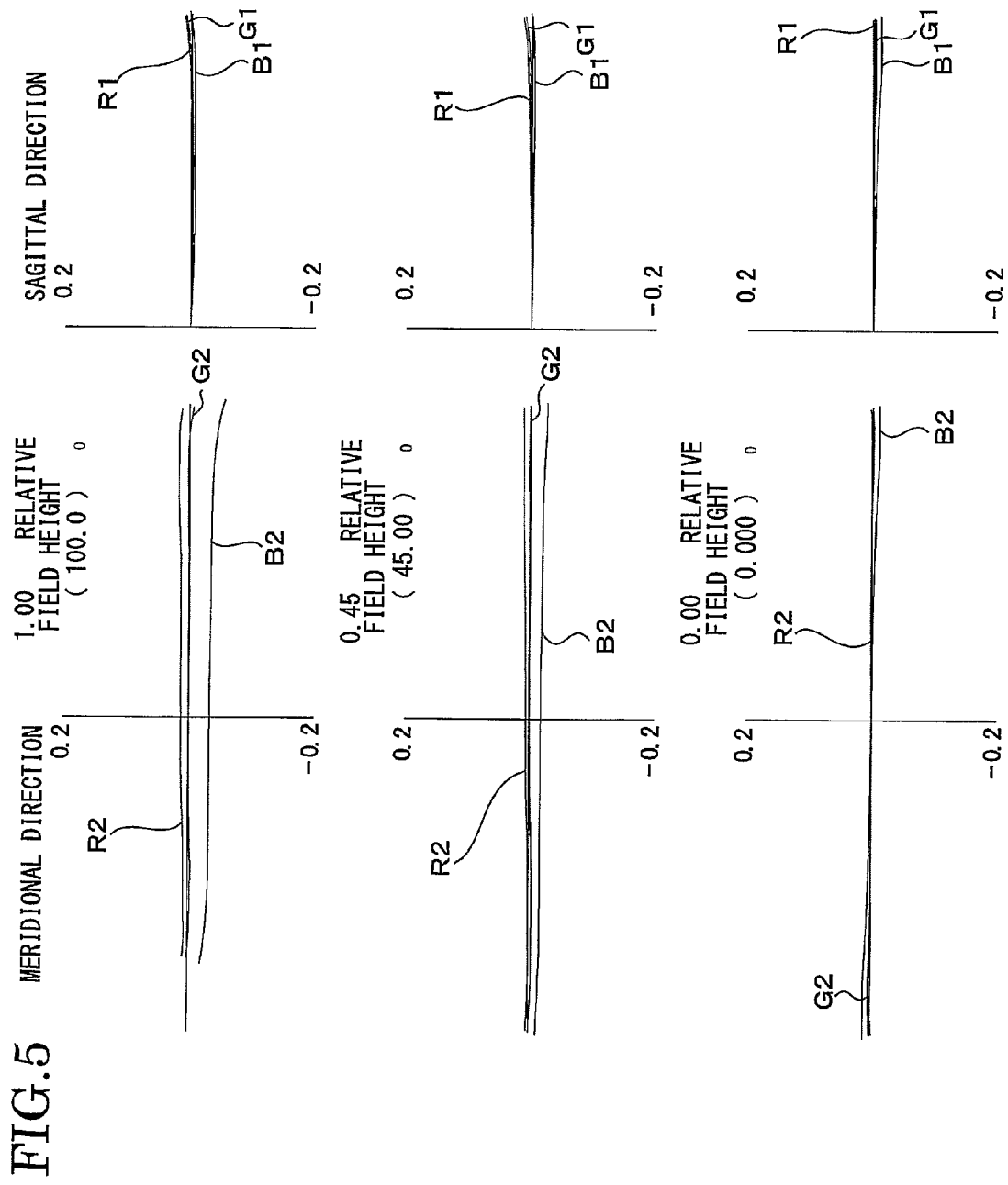
FIG. 5 is a diagram illustrating a coma aberration curve of the wide-angle lens illustrated in FIG. 1.

FIG. 3 is an astigmatism diagram of this specific example, FIG. 4 is a distortion diagram of this specific example, and FIG. 5 is a coma aberration diagram of this specific example.

The distortion diagram of FIG. 4 illustrates a distortion amount calculated by using a stereographic projection method (a projection method expressed by Y=2f×TAN(θ/2), where Y expresses an image height, f expresses a focal length, θ expresses a half angle of view), and the following Table 4 illustrates numerical values used for drawing the distortion diagram.

TABLE 4

| FOCAL LENGTH OF WHOLE IMAGING LENS SYSTEM | | | 0.95 | |
|---|---|---|---|---|
| HALF ANGLE OF VIEW (degree) | REAL IMAGE HEIGHT | ANGLE OF VIEW (rad) | IDEAL IMAGE HEIGHT OF STEREOGRAPHIC PROJECTION METHOD | Dist (%) |
| 0 | 0 | 0 | 0.0000 | 0.00% |
| 10 | 0.168164 | 0.174533 | 0.1662 | 1.16% |
| 20 | 0.348609 | 0.349066 | 0.3350 | 4.06% |
| 30 | 0.551012 | 0.523599 | 0.5091 | 8.23% |
| 40 | 0.777539 | 0.698132 | 0.6915 | 12.44% |
| 50 | 1.01774 | 0.872665 | 0.8860 | 14.87% |
| 60 | 1.24935 | 1.047198 | 1.0970 | 13.89% |
| 70 | 1.44746 | 1.22173 | 1.3304 | 8.80% |
| 80 | 1.59761 | 1.396263 | 1.5943 | 0.21% |
| 90.5 | 1.70807 | 1.579523 | 1.9167 | −10.88% |
| 95 | 1.74492 | 1.658063 | 2.0735 | −15.85% |
| 100 | 1.78095 | 1.745329 | 2.2643 | −21.35% |

In the astigmatism diagram and the coma aberration diagram, reference symbol R1 denotes an aberration curve in the sagittal direction (illustrated by a dashed-line in FIG. 3) of a 650 nm-wavelength (red), reference symbol R2 (a solid line) denotes an aberration curve in the meridional direction of the 650 nm-wavelength (red), reference symbol G1 denotes an aberration curve in the sagittal direction (illustrated by a dashed-line in FIG. 3) of a 587.56 nm-wavelength (green), reference symbol G2 (a solid line) denotes an aberration curve in the meridional direction of the 587.56 nm-wavelength (green), reference symbol B1 denotes an aberration curve in the sagittal direction (illustrated by a dashed-line in FIG. 3) of a 450 nm-wavelength (blue), and reference symbol B2 (a solid line) denotes an aberration curve in the meridional direction of the 450 nm-wavelength (blue).

In this specific example, an Abbe's number ν4 of the fourth lens element L4 is 81.6, and a low dispersion material with a greatly large Abbe's number is used for the fourth lens element L4.

Therefore, as is apparent from the astigmatism curve illustrated in FIG. 3 and the coma aberration curve in FIG. 5, a chromatic aberration of the fourth lens element L4 is small. Accordingly, the chromatic aberration on the image plane 3 can be reduced without increasing the thickness of the third lens element L3.

And since the surface r4 on the image side of the second lens element L2 which has the negative power is arranged secondarily from the object side of the front lens group 1 is an aspheric surface such that a curvature gradually becomes smaller toward the optical axis O, the difference between the power in the sagittal direction and the power in the meridional direction that the off-axis light receives from the surface r4 can be reduced. Therefore, the generation of astigmatism can be inhibited, as illustrated in FIG. 3, and the resolution on the image surface 3 can be improved.

Example 2

Figure 6:
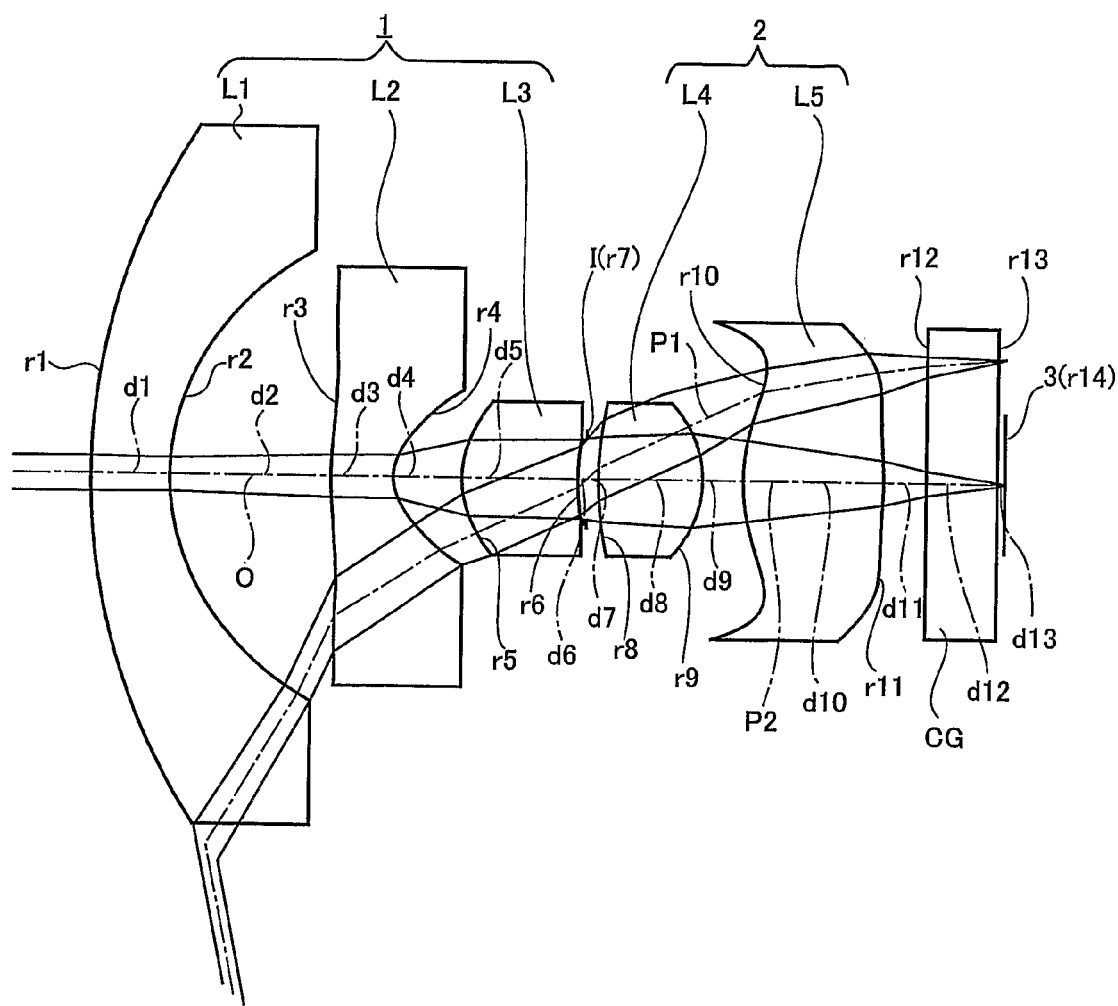
FIG. 6 is an optical diagram of a wide-angle lens according to Example 2 of the present invention.
Figure 7:
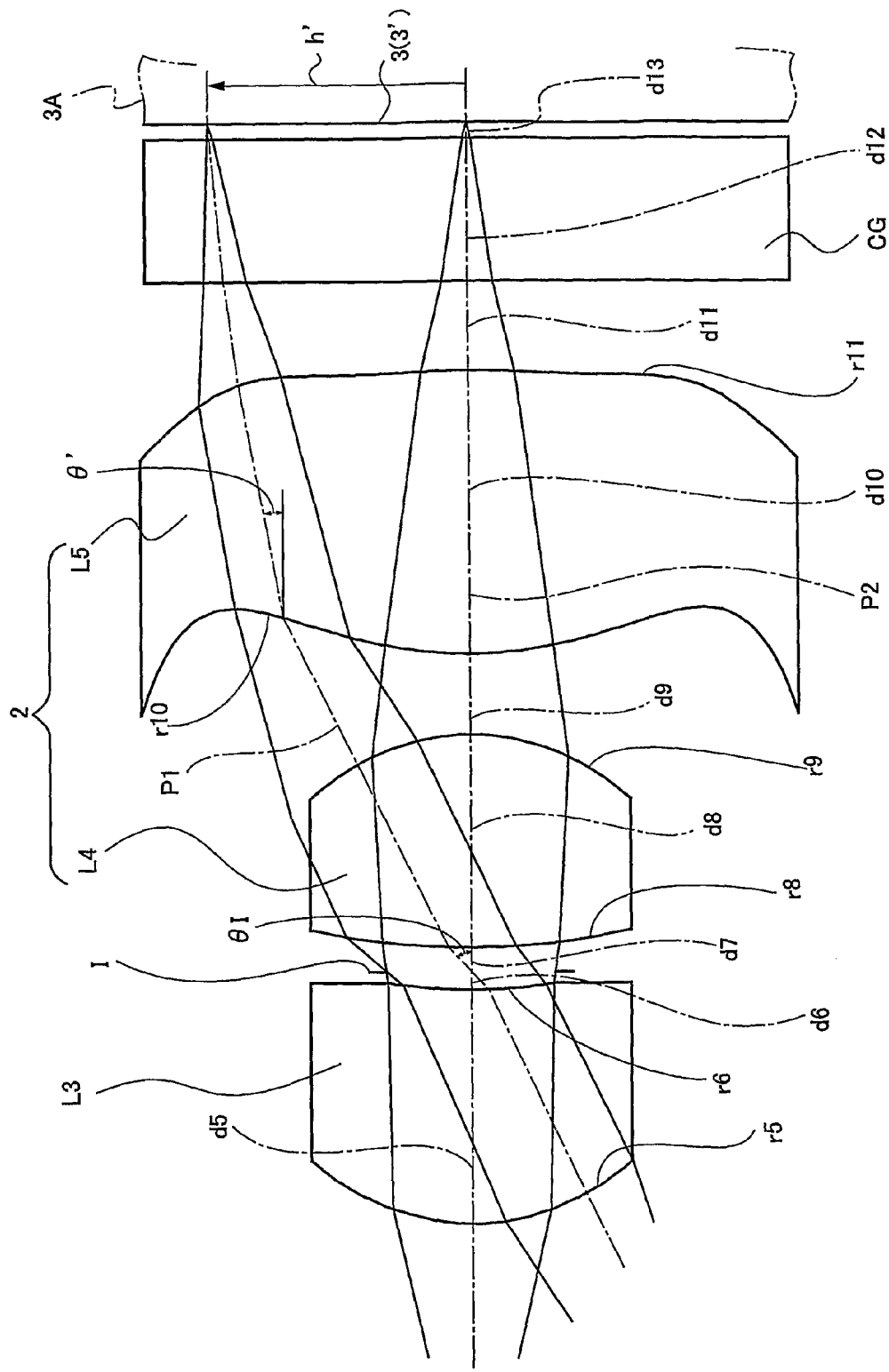
FIG. 7 is a partially-enlarged diagram of the wide-angle lens illustrated in FIG. 6.

FIG. 6 illustrates an imaging lens system of Example 2 of an embodiment of an invention of the wide-angle lens according to the present invention, and FIG. 7 is a partially-enlarged diagram of the imaging lens system illustrated in FIG. 6.

In FIG. 6, optical elements the same as the optical elements of Example 1 are denoted by the same references and their explanations are not given.

The following Tables 5 to 8 illustrate a specific example of the wide-angle lens illustrated in FIG. 6.

In the specific example of Example 2, an f-number designed for the wide-angle lens, and a designed reference wavelength of the luminous flux are the same as the specific example of Example 1. A definitional equation used for specifying the aspheric surface is also the same as that in Example 1, and in Table 5, numerical values of the surface number, the curvature radius r, the surface interval d, the refractive index n, and the Abbe's number ν are illustrated as well as in Table 1.

In Table 6, specific numerical values of the conic constant K of the aspheric surface, and aspheric surface coefficients A, B and C regarding the surface numbers 3 to 6, 10, and 11 of this wide-angle lens are illustrated as well as in Table 2. And in Table 7, the specific value of the focal length, the specific value of the incident angle θI satisfying Expression 1, and the specific value of the Abbe's number ν4 satisfying Expression 2 of this wide-angle lens are illustrated as well as in Table 3. In Table 8, numerical values used for describing the distortion diagram are illustrated as well as in Table 4.

TABLE 5

| | SURFACE NUMBER | CURVATURE RADIUS r | SURFACE INTERVAL d | REFRACTIVE INDEX n | ABBE'S NUMBER ν | ASPHERIC SURFACE |
|---|---|---|---|---|---|---|
| L1 | 1 | 10.000 | $d_1$ 1.000 | 1.8350 | 42.9 | |
| | 2 | 3.778 | $d_2$ 2.041 | | | |
| L2 | 3 | 6.031 | $d_3$ 0.800 | 1.5565 | 36.7 | ○ |
| | 4 | 0.748 | $d_4$ 0.901 | | | ○ |
| L3 | 5 | 1.586 | $d_5$ 1.465 | 1.5840 | 30.8 | ○ |
| | 6 | 4.634 | $d_6$ 0.113 | | | ○ |
| | 7 (APERTURE I) | ∞ | $d_7$ 0.150 | | | |
| L4 | 8 | 5.404 | $d_8$ 1.340 | 1.4875 | 70.4 | |
| | 9 | −1.692 | $d_9$ 0.512 | | | |
| L5 | 10 | 3.138 | $d_{10}$ 1.785 | 1.5327 | 56.7 | ○ |
| | 11 | −6.255 | $d_{11}$ 0.560 | | | ○ |
| | 12 | ∞ | $d_{12}$ 0.900 | 1.5163 | 64.1 | |
| | 13 | ∞ | $d_{13}$ 0.100 | | | |
| | 14 (IMAGE PLANE) | | | | | |

○ = ASPHERIC SURFACE

TABLE 6

| SURFACE NUMBER | K | A | B | C |
|---|---|---|---|---|
| 3 | 0.845284 | −0.031710 | 0.004325 | −0.000211 |
| 4 | −0.701726 | −0.153872 | −0.055343 | 0.004503 |
| 5 | 0.486879 | −0.029159 | −0.047503 | 0.010628 |
| 6 | −18.643642 | 0.112920 | −0.118321 | 0.195075 |
| 10 | −0.516458 | −0.003464 | −0.004830 | −0.000726 |
| 11 | 6.311363 | 0.086128 | −0.034311 | 0.003598 |

TABLE 7

| FOCAL LENGTH | 1.00 |
|---|---|
| SPECIFIC VALUE OF INCIDENT ANGLE SATISFYING EXPRESSION 1 | 45.9° |
| SPECIFIC VALUE OF ABBE'S NUMBER SATISFYING EXPRESSION 2 | 70.4 |

TABLE 8

FOCAL LENGTH OF WHOLE IMAGING LENS SYSTEM 1

| HALF ANGLE OF VIEW (degree) | REAL IMAGE HEIGHT | ANGLE OF VIEW (rad) | IDEAL IMAGE HEIGHT OF STEREOGRAPHIC PROJECTION METHOD | Dist (%) |
|---|---|---|---|---|
| 0 | 0 | 0 | 0.0000 | 0.00% |
| 10 | 0.177157 | 0.1745329 | 0.1750 | 1.25% |
| 20 | 0.362422 | 0.3490659 | 0.3527 | 2.77% |
| 30 | 0.562185 | 0.5235988 | 0.5359 | 4.91% |
| 40 | 0.778113 | 0.6981317 | 0.7279 | 6.89% |
| 50 | 1.0033 | 0.8726646 | 0.9326 | 7.58% |
| 60 | 1.22154 | 1.0471976 | 1.1547 | 5.79% |
| 70 | 1.41399 | 1.2217305 | 1.4004 | 0.97% |
| 80 | 1.57015 | 1.3962634 | 1.6782 | −6.44% |
| 90.5 | 1.69816 | 1.579523 | 2.0175 | −15.83% |
| 95 | 1.74482 | 1.6580628 | 2.1826 | −20.06% |
| 100 | 1.79291 | 1.7453293 | 2.3835 | −24.78% |

By setting the incident angle θI to be 45.9° as described in Table 7, a maximum value of the incident angle to the optical axis O of the chief ray P1 incident on the image plane 3 of the wide-angle lens of Example 1 becomes approximately 12.3°, and this makes it possible for the value to be small, and therefore it is possible to inhibit a decrease in the amount of light incident on the image plane 3, that is, the imaging plane 3' of the image sensor 3A. Additionally, the overall length of the imaging lens system is also shortened to 11.667 mm, and it is possible to miniaturize the imaging lens system.

Figure 8:
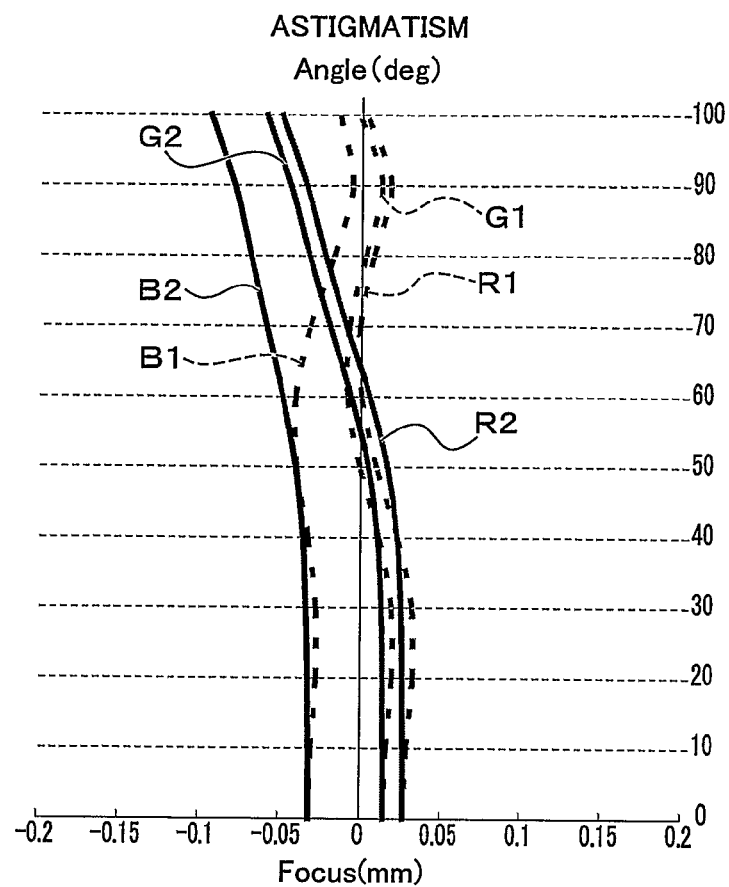
FIG. 8 is a diagram illustrating an astigmatism curve of the wide-angle lens illustrated in FIG. 6.
Figure 9:
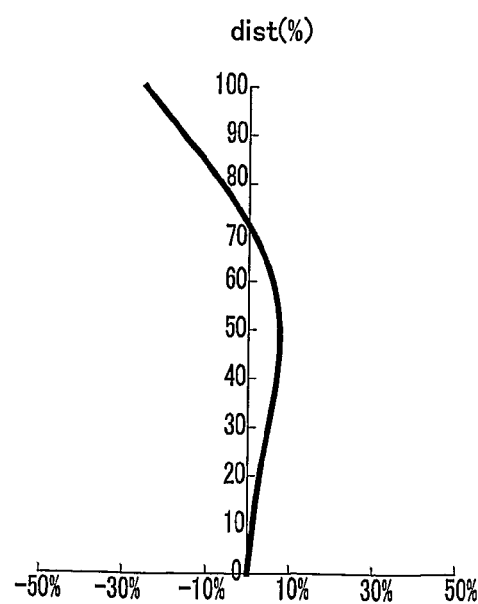
FIG. 9 is a diagram illustrating a distortion curve of the wide-angle lens illustrated in FIG. 7.
Figure 10:
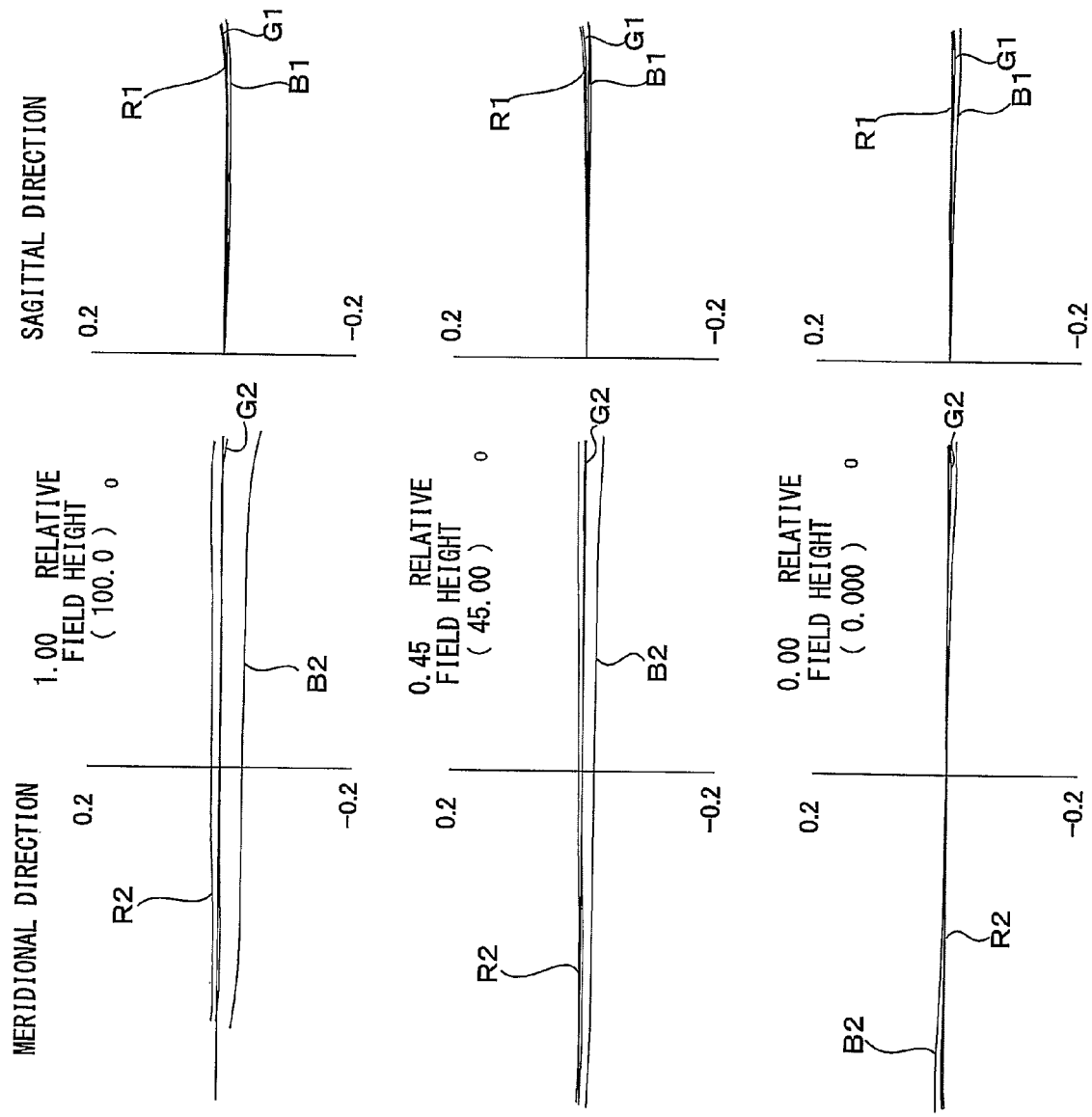
FIG. 10 is a diagram illustrating a coma aberration curve of the wide-angle lens illustrated in FIG. 8.

FIG. 8 is an astigmatism diagram corresponding to FIG. 3, FIG. 9 is a distortion diagram corresponding to FIG. 4, and FIG. 10 is a coma aberration diagram corresponding to FIG. 5, and the meaning of references in FIG. 8 is the same as those in Example 1.

In this specific example, the Abbe's number ν4 of the fourth lens element L4 is 70.4, and the low dispersion material with the large Abbe's number is used as well as in Example 1.

Therefore, as is apparent from an astigmatism curve illustrated in FIG. 8 and a coma aberration curve in FIG. 10, a chromatic aberration of the fourth lens element L4 is small as well as in Example 1. Accordingly, the chromatic aberration on the image plane 3 can be reduced without increasing the thickness of the third lens element L3.

And since the surface r4 on the image side of the second lens element L2 which has the negative power and is arranged secondarily from the object side of the front lens group 1 is an aspheric surface such that a curvature gradually becomes smaller toward the optical axis O, a difference between the power in the sagittal direction and the power in the meridional direction that the off-axis light receives from the surface r4 can be reduced. Therefore, the generation of astigmatism can be inhibited, as illustrated in FIG. 8, and the resolution on the image surface 3 can be improved.

Example 3

Hereinafter, an imaging apparatus (an in-vehicle camera device) having the wide-angle lens according to the present invention will be explained.

Here, the wide-angle lens having an optical characteristic explained in Example 1 is used for this imaging apparatus. And the wide-angle lens having an optical characteristic explained in Example 2 may also be used for this imaging apparatus.

As described above, an image sensor such as a CCD or CMOS, that is, an image sensor having pixels arranged two-dimensionally and converting an image of a photographic subject imaged on the pixels by the wide-angle lens into image data, is used for the image sensor 3A.

This imaging apparatus comprises: a memory, a memory output controller, a first signal processer, a second signal processor, and a third signal processor. The memory stores the image data outputted from the image sensor 3A. The memory output controller controls the memory to output image data according to a specified angle of view from the memory. The first signal processor corrects a distortion of the wide-angle lens. The second signal processor corrects a lateral chromatic aberration of the wide-angle lens. The third signal processor corrects an MTF (modulation transfer function) of the wide-angle lens.

Details of the above are explained as follows.

Figure 11:
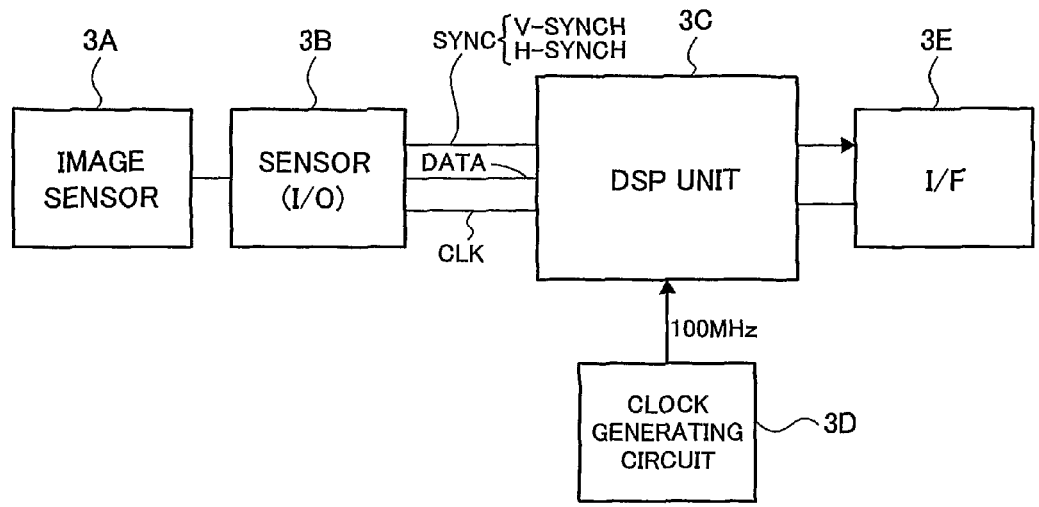
FIG. 11 illustrates a general image processing block diagram of an imaging apparatus according to Example 3 of the present invention.

FIG. 11 is a general block diagram of the imaging apparatus. A photoelectric conversion signal of the image sensor 3A is outputted from a sensor (I/O) (input/output) 3B. The output of the sensor (I/O) 3B is, for instance, SYNC (synchronization) (V-SYNC (vertical synchronization), H-SYNC (horizontal synchronization)), DATA, and CLK (clock) signal. The DATA signal is a 10-bit signal per R, G, and B, respectively, and the CLK signal is, for instance, 25 MHz.

Each of these signals is inputted to the signal processing unit (DSP (digital signal processing) unit) 3C and processed. The DSP unit 3C has the memory, the memory output controller, the first, the second, and the third signal processors having the above functions.

Programmable logic such as an FPGA (field-programmable gate array) and a DSP (digital signal processing), or an ASIC (application-specific integrated circuit) or the like, or anything which achieves a processing described later on an input signal may be suitable for a hardware configuration of the DSP unit 3C. To the DSP unit 3C, for example, a 100 MHz-clock signal is inputted from a clock generating circuit 3D.

An output of the DSP unit 3C is converted and outputted by an I/F (interface) 3E to become a desired output. For digital output formats, there are YUV422, YUV444, YUV221 and so on; however, here, the output is converted to NTSC.

Figure 12:
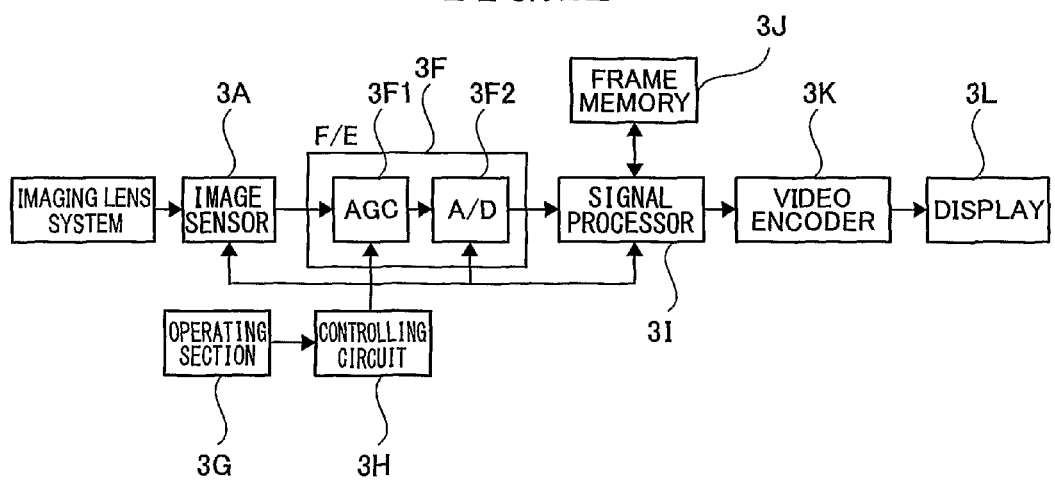
FIG. 12 illustrates a more detailed configuration of the image processing block diagram illustrated in FIG. 11.

FIG. 12 is a block diagram illustrating a more detailed configuration of the imaging apparatus.

The image of the photographic subject imaged on the image plane 3 (imaging plane 3') by the imaging lens system illustrated in FIG. 1 is photoelectric-converted by the image sensor 3A and becomes image data at the end. The image of the photographic subject imaged by this imaging lens system has the distortion illustrated in FIG. 4 and the lateral chromatic aberration illustrated in FIG. 3.

After the image data outputted from the image sensor 3A is automatic-gain-controlled by an automatic gain controller (AGC) 3F1 of a front-end processor (F/E) 3F, the image data is converted to a digital signal by an A/D (analog-to-digital) convertor 3F2 and becomes digital image data. The automatic gain controller 3F1 is adjusted by controlling a circuit 3H based on an operation of an operating section 3G.

The digital image data is image-processed by a signal processor 3I. A correction processing of a deteriorated image caused by the image sensor 3A and a correction processing of a deteriorated image caused by the imaging lens system are included in this image processing.

For instance, as for pixel arrays of the image sensor 3A, a Bayer array can be included as an example in which the number of pixels of green (G) is more than the number of pixels of red (R) and blue (B), and so on. In a case where each image of R, G, and B is produced, simply only by taking out and synthesizing image data of R, G, and B, a displacement of images of each color by a displacement of each pixel array occurs.

In the signal processor 3I, first of all, a rearrangement of these pixels, a correction processing of white balance among R, G and B and so on are performed. In this image processing, after performing the correction processing of the deteriorated image caused by the image sensor 3A, correction processings of the lateral chromatic aberration, the distortion and a deterioration of the MTF as a deteriorated image factor caused by the imaging lens system are performed.

When these correction processings are performed, the image data of R, G, and B is temporarily stored in a frame memory (memory) 3J. The controlling circuit 3H also functions as a memory output controller which controls a memory to output the image data according to the specified angle of view from the memory. The image data read from the frame memory 3J is processed by the signal processor 3I if needed.

Figure 13:
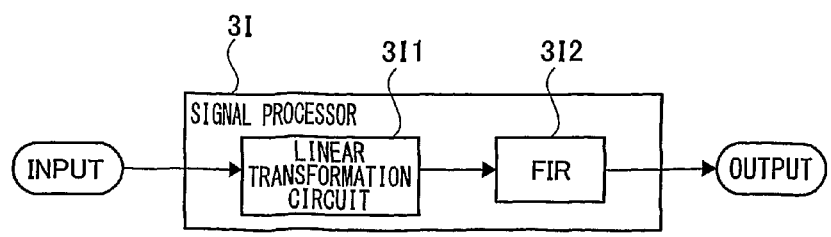
FIG. 13 is a block diagram illustrating a more detailed configuration of a signal processor illustrated in FIG. 12.

FIG. 13 illustrates a more detailed configuration of the signal processor 3I, and here, only detailed configurations of the first, the second, and the third signal processors are illustrated.

The first signal processor and the second signal processor comprise a linear transformation circuit 3I1. The third signal processor comprises an FIR (finite impulse response) filter 3I2.

In the linear transformation circuit 3I1, each digital image data of R, G, and B on which the correction processing of the deteriorated image caused by a hardware configuration of the image sensor 3A is already performed is inputted. The linear transformation circuit 3I1 performs a linear transformation processing on the image data of R, G, and B. This linear transformation processing is a coordinate conversion processing to convert coordinates of inputted image data to new coordinates, while taking account of a distortion of the image of the photographic subject by the distortion. And thereby, the correction processing of the distortion is executed.

The distortion is defined as a characteristic of the wide-angle lens beforehand in design and therefore is known. And the distortion is actually obtained by measuring. Based on the characteristic of the distortion, a coordinate conversion expression to convert the coordinates of the inputted image data to the new coordinates is determined. By use of this coordinate conversion expression, image data where the distortion is reduced, that is, the image data where the distortion is corrected, is obtained. This conversion expression can be approximated by a polynomial expression, for example.

By performing the correction of the distortion on the image of R, G, and B respectively, the correction of the lateral chromatic aberration is also performed concurrently.

Thus, the linear transformation circuit 311 has functions of the first signal processor to perform the correction processing of the distortion and of the second signal processor to perform the correction processing of the lateral chromatic aberration.

Distribution of the light amount is changed by pixel data passing between pixels by the coordinate conversion expression, and shading may occur. Accordingly, a correction of an unevenness of the light amount is performed by multiplying the brightness of each pixel by a coefficient according to the number of pixel data passing for each pixel.

Thus, the digital image data to which the distortion and the lateral chromatic aberration are corrected is inputted to the following FIR filter 312. The FIR filter 312 performs processing such as deconvolution of the digital image data outputted from the linear transformation circuit 311.

Therefore, the deterioration of the MTF is inhibited. A Wiener filter or a simple HPF (high-pass filter) can be used as this FIR filter.

Figure 14:
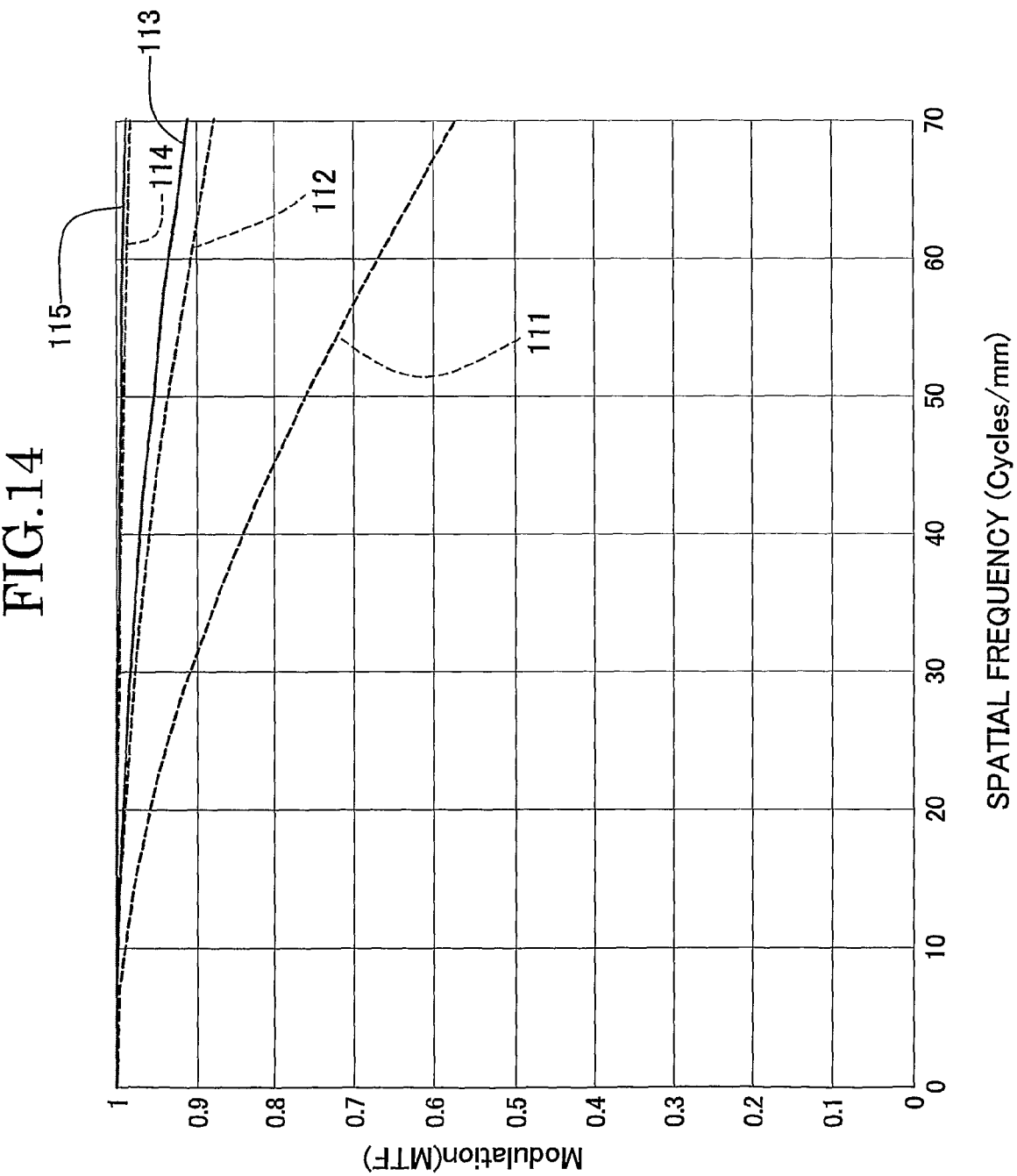
FIG. 14 is an MTF (modulation transfer function) characteristic curve diagram of the imaging apparatus according to Example 3 of the present invention.

FIG. 14 illustrates a result of performing the processing explained in conformity with FIGS. 12 and 13 on the image data imaged by use of the wide-angle lens of Example 1.

In this FIG. 14, a horizontal axis expresses a spatial frequency, and a vertical axis expresses a brightness signal of the MTF. In a case where the correction processing is not performed on the image data, the MTF is deteriorated, as illustrated by a curve denoted by reference symbol 111, by the lateral chromatic aberration, as the frequency becomes higher.

On the other hand, when the correction of the lateral chromatic aberration and the correction of the distortion are performed, the deterioration of the MTF can be inhibited. In addition, by compensating a high-frequency component by use of the FIR filter, a clear image having a further sufficient MTF in a high-frequency area can be obtained.

A curve 112 illustrates an MTF regarding the sagittal direction when the lateral chromatic aberration is corrected. A curve 113 illustrates an MTF regarding the meridional (tangential) direction when the lateral chromatic aberration is corrected. A curve 114 illustrates an MTF regarding the sagittal direction when the lateral chromatic aberration, the distortion and the deterioration of the MTF are corrected. A curve 115 illustrates an MTF regarding the meridional (tangential) direction when the lateral chromatic aberration, the distortion and the deterioration of the MTF are corrected. The resolution is corrected well as illustrated by the curves 112, 113, 114, and 115.

That is, a difference between the curve 111 and the curve 112, a difference between the curve 111 and the curve 113, a difference between the curve 111 and the curve 114, and a difference between the curve 111 and the curve 115 in FIG. 14 respectively describe a correction effect of the resolution corrected by use of the processing by an electronic circuit.

In the present invention, the imaging lens system and an image processing system are designed in consideration of the quality of an image. That is, the deterioration of a value of the optical characteristic which is hard to correct by the imaging lens system is corrected by the image processing system, and thereby a desired value of the optical characteristic is achieved. Accordingly, it is possible to design an optical imaging system easily. In addition, it is possible to improve the quality of the image.

As for the image on which these correction processings are performed, the deterioration based on the lateral chromatic aberration and the distortion of the wide-angle lens of the imaging lens system is corrected. Moreover, the MTF which is decreased in the peripheral part of the image and so on is also corrected. In a case where a still image is outputted, bit map data, an image in JPEG format and so on are produced from each corrected image of R, G, and B, and are outputted as the still image.

On the other hand, in a case where a moving image is outputted, as illustrated in FIG. 12, via a video encoder 3K, an image in moving image format such as H.264, MPEG2, and MPEG4 is generated from each image of R, G, and B. For a digital output, an image is converted into data of an HDMI (high-definition multimedia interface) specification or a DVI (digital visual interface) specification, and is outputted to a display 3L. And for an analog output, an image is converted into an NTSC signal, a D2 signal, a D4 signal, a component signal, and etc. via a D/A (digital-to-analog) conversion circuit, and is outputted to the display 3L.

These above processing methods are explained in detail in Japanese Patent Publication No. 2008-35263; therefore details are not explained here.

According to the wide-angle lens of embodiments of the present invention, the overall length of the imaging lens system is shortened, and the incident angle of the chief ray onto the image plane is comparatively reduced; therefore it is possible to provide a wide-angle lens in which the light amount loss in the peripheral area of the image sensor is small and which is low-cost.

According to the wide-angle lens of the embodiments of the present invention, it is possible to decrease the chromatic aberration on the image plane without increasing the thickness of the third lens element immediately anterior to the aperture of the front lens group.

According to the wide-angle lens of the embodiments of the present invention, it is suitable for use in an in-vehicle camera device.

According to the wide-angle lens of the embodiments of the present invention, the corrections of the distortion and the astigmatism of the imaging lens system are easily achieved, and the incident angle of the chief ray onto the image plane is controlled easily, and the resolution on the image plane is improved. Moreover, the light amount loss of the luminous flux incident on the image sensor is decreased.

According to the wide-angle lens of the embodiments of the present invention, the first lens element exposed on the object side is made of glass; therefore a surface of the lens is not easily scratched According to the wide-angle lens of the embodiments of the present invention, the difference between the power in the sagittal direction and the power in the meridional direction is decreased, therefore the generation of astigmatism is inhibited, and the resolution on the image plane is improved.

According to the imaging apparatus of the embodiments of the present invention, it is possible to decrease only the aberration and the distortion, which are difficult to correct optically by the imaging lens system, by the image processing, and provide an image of the photographic subject where the resolution is improved.

According to the in-car camera device of the embodiments of the present invention, it is suitable for use in an in-car photographing system to take information outside a car, and display the information in the car.

Although the present invention has been described in terms of exemplary embodiments, it is not limited hereto. It should be appreciated that variations may be made in the embodiments described by persons skilled in the art without departing from the scope of the present invention as defined by the following claims.

The present invention is based on and claims priority from Japanese Patent Application Number 2008-247324, filed Sep. 26, 2008, the disclosure of which is hereby incorporated by reference herein its entirety.

The invention claimed is:

1. A wide-angle lens comprising:
an imaging lens system, including:
a front lens group arranged on an object side,
a rear lens group arranged on an image side, and
an aperture arranged therebetween, and
the front lens group and the rear lens group are constructed of five lens elements in total, wherein
the front lens group in which two lens elements, which are first and second lens elements, having negative power respectively, and one lens element, which is a third lens element having positive power, are arranged in order from the object side to an aperture side, and the rear lens group in which two lens elements, which are fourth and fifth lens elements, having positive power respectively, are arranged in order from the aperture side to the image side, and
where an incident angle to an optical axis of the imaging lens system of a chief ray of a maximum angle of view passing through the aperture is θI, the following Expression 1 is satisfied, wherein $$40° \text{ (degrees)} < θI < 60° \text{ (degrees)} \qquad \text{Expression 1.}$$

2. The wide-angle lens according to claim 1, wherein the incident angle θI is defined in a meridional plane.

3. The wide-angle lens according to claim 2, wherein the fourth lens element is constructed such that an angle between a chief ray radiated from the fourth lens element and the optical axis becomes smaller than an angle between a chief ray incident on the fourth lens element, and the fifth lens element is constructed of an aspheric lens such that an angle between a chief ray radiated from the fifth lens element and the optical axis becomes smaller than an angle between a chief ray radiated from the fourth lens element and incident on the fifth lens element and the optical axis.

4. The wide-angle lens according to claim 1, wherein where an Abbe's number of the fourth lens element is ν4, the following Expression 2 is satisfied, wherein $$ν4 > 70 \qquad \text{Expression 2.}$$

5. The wide-angle lens according to claim 1, wherein the wide-angle lens has an angle of view exceeding 180 degrees.

6. The wide-angle lens according to claim 1, wherein a surface on the image side of the fifth lens element is an aspheric surface.

7. The wide-angle lens according to claim 1, wherein a material of the first lens element is glass.

8. The wide-angle lens according to claim 1, wherein a surface on the image side of the second lens element is an aspheric surface.

9. An imaging apparatus, comprising:
a wide-angle lens, including:
an imaging lens system, having;
a front lens group arranged on an object side,
a rear lens group arranged on an image side, and
an aperture arranged therebetween, and
the front lens group and the rear lens group are constructed of five lens elements in total, wherein the front lens group in which two lens elements, which are first and second lens elements, having negative power respectively, and one lens element, which is a third lens element having positive power, are arranged in order from the object side to an aperture side, and the rear lens group in which two lens elements, which are fourth and fifth lens elements, having positive power respectively, are arranged in order from the aperture side to the image side, and where an incident angle to an optical axis of the imaging lens system of a chief ray of a maximum angle of view passing through the aperture is θI, the following Expression 1 is satisfied;
an image sensor which has a pixel arranged two-dimensionally and converts a photographic subject imaged on the pixel by the wide-angle lens to image data;
a memory which stores image data outputted from the image sensor;
a memory output controller which reads out image data according to a specified angle from the memory;
a first signal processor, which corrects a distortion of the wide-angle lens;
a second signal processor which corrects a lateral chromatic aberration of the wide-angle lens; and
a third signal processor which corrects a modulation transfer function (MTF) of the wide-angle lens, wherein $$40° \text{ (degrees)} < θI < 60° \text{ (degrees)} \qquad \text{Expression 1.}$$

10. An in-car camera device, comprising:
an imaging apparatus, including:
a wide-angle lens, having:
an imaging lens system, having:
a front lens group arranged on an object side,
a rear lens group arranged on an image side, and
an aperture arranged therebetween, and
the front lens group and the rear lens group are constructed of five lens elements in total, wherein the front lens group in which two lens elements, which are first and second lens elements, having negative power respectively, and one lens element, which is a third lens element having positive power, are arranged in order from the object side to an aperture side, and the rear lens group in which two lens elements, which are fourth and fifth lens elements, having positive power respectively, are arranged in order from the aperture side to the image side, and where an incident angle to an optical axis of the imaging lens system of a chief ray of a maximum angle of view passing through the aperture is θI, the following Expression 1 is satisfied;
an image sensor which has a pixel arranged two-dimensionally and converts a photographic subject imaged on the pixel by the wide-angle lens to image data;
a memory which stores image data outputted from the image sensor;
a memory output controller which reads out image data according to a specified angle from the memory;
a first signal processor which corrects a distortion of the wide-angle lens;
a second signal processor which corrects a lateral chromatic aberration of the wide-angle lens; and
a third signal processor which corrects a modulation transfer function (MTF) of the wide-angle lens, wherein $$40° \text{ (degrees)} < θI < 60° \text{ (degrees)} \qquad \text{Expression 1.}$$

11. The wide-angle lens according to claim 1, wherein none of the five lens elements are cemented.

12. The wide-angle lens according to claim 1, wherein a material of the second, third, and fifth lens elements are plastic.

13. A wide-angle lens comprising:
an imaging lens system, including:
a front lens group arranged on an object side,
a rear lens group arranged on an image side, and an aperture arranged therebetween, and
the front lens group and the rear lens group are constructed of five lens elements in total, wherein
the front lens group in which two lens elements, which are first and second lens elements, having negative power respectively, and one lens element, which is a third lens element having positive power, are arranged in order from the object side to an aperture side, and the rear lens group in which two lens elements, which are fourth and fifth lens elements, having positive power respectively, are arranged in order from the aperture side to the image side,
where an incident angle to an optical axis of the imaging lens system of a chief ray of a maximum angle of view passing through the aperture is θI, the following Expression 1 is satisfied,
wherein where an Abbe's number of the fourth lens element is ν4, the following Expression 2 is satisfied,
wherein a surface on the image side of the fifth lens element is an aspheric surface, and
wherein a surface on the image side of the second lens element is an aspheric surface, wherein $$40° \text{ (degrees)} < \theta I < 60° \text{ (degrees)} \qquad \text{Expression 1, and}$$

$$\nu 4 > 70 \qquad \text{Expression 2.}$$

* * * * *